United States Patent
Walker

[15] 3,668,395
[45] June 6, 1972

[54] SCINTILLATION CAMERA HAVING IMPROVED PERIPHERAL RESPONSE

[72] Inventor: William G. Walker, Schiller Park, Ill.
[73] Assignee: Nuclear-Chicago Corporation, Des Plaines, Ill.
[22] Filed: Dec. 17, 1969
[21] Appl. No.: 871,479

Related U.S. Application Data

[63] Continuation of Ser. No. 717,750, Apr. 1, 1968, abandoned.

[52] U.S. Cl. .................................................. 250/71.5 R
[51] Int. Cl. .................................................. G01t 1/20
[58] Field of Search .................. 250/71.5 R, 71.5 S, 105

[56] References Cited

UNITED STATES PATENTS

| | | | |
|---|---|---|---|
| 3,011,057 | 11/1961 | Anger | 250/71.5 R |
| 3,373,286 | 3/1968 | Han | 250/105 |
| 3,507,734 | 4/1970 | Ruderman | 250/71.5 R X |
| 3,531,651 | 9/1970 | Lieber et al | 250/71.5 S |

OTHER PUBLICATIONS

Nucleonics, " The Autofluoroscope," Bender et al., Vol. 21, No. 10, Oct. 1963, pp. 52– 56.
Nucleonics, " Gamma–Ray and Position Scintillation Camera," Anger, Vol. 21, No. 10, Oct. 1963, pp. 56– 59.
The Review of Scientific Instruments, " Scintillation Camera," Anger, Vol. 29, No. 1, Jan. 1958, pp. 27– 33.

Primary Examiner—James W. Lawrence
Assistant Examiner—Davis L. Willis
Attorney—Mason, Kolehmainen, Rathburn & Wyss

[57] ABSTRACT

A substantial increase in the diameter of the useable light image generated by a scintillation camera equipped with a multiple collimator is achieved by using a collimator that does not include holes which allow radiation to strike the periphery of the scintillator.

21 Claims, 4 Drawing Figures

PATENTED JUN 6 1972 3,668,395

Inventor:
William G. Walker
By
Mason, Kolehmainen, Rathburn & Wyss
Atty's

SCINTILLATION CAMERA HAVING IMPROVED PERIPHERAL RESPONSE

BACKGROUND OF THE INVENTION

This invention relates to radiation detectors, and more particularly to scintillation cameras and like radioisotope imaging devices. The present application is a continuation of U. S. application Ser. No. 717,750 filed Apr. 1, 1968 and now abandoned.

A scintillation camera is an imaging device that includes a collimator, a scintillator, and a light amplifier in combination with some means for developing an image in response to scintillations caused by impingement of radioactivity upon the scintillator after passing through the collimator. The collimator is usually a solid block of radioactive shielding material through which has been bored a plurality of holes. The scintillator is usually a thin circular wafer of a scintillating material, such as a crystal of sodium iodide activated with thallium, and is positioned with one flat side facing the collimator and with the other flat side facing the light amplifier. In the most common form of scintillation camera in use today, namely the so-called Anger camera of the type described and claimed in U. S. Pat. No. 3,011,057 issued to Hal O. Anger, the light amplifier includes an array of photomultiplier tubes spaced a small distance from the scintillator and these tubes are connected to a cathode ray oscilloscope by suitable interconnecting circuitry.

Scintillation cameras are used to investigate and to image distributions of radiation, for example, the distribution of a radioactive isotope "in vivo." The camera is positioned with the collimator facing the distribution of radiation. The collimator allows only those radioactive emissions travelling along centerlines of the collimator holes to strike the scintillator and to produce scintillations. Each individual scintillation is detected by several of the photomultiplier tubes, and the interconnecting circuitry utilizes the signals from the photomultiplier tubes to determine the position of each scintillation and to generate light spots or dots on the face of the oscilloscope at corresponding positions. The light spots are recorded upon photographic film in the manner described in the aforementioned U. S. Pat. No. 3,011,057. The resulting photograph is an image of the distribution, and the density of light spots at each point in the photograph is a measure of radiation intensity at corresponding points within the distribution.

The quality of the image produced by a scintillation camera is quite good towards the center, but deteriorates rapidly towards the edges. FIG. 3 illustrates graphically the nature and magnitude of this edge distortion phenomenon as experimentally measured. In the graph, the abscissa or x-axis represents locations along an arbitrarily selected diameter of an image produced by a scintillation camera equipped with a scintillator 11 inches in diameter and a collimator having a perforated surface 10.6 inches in diameter. The ordinate or y-axis represents the density of light spots produced along this diameter when the scintillation camera is exposed to a uniform beam of radiation. Ideally, there should be no peaks or valleys in the curve of FIG. 3. It can be seen that the image departs significantly from the ideal and becomes highly nonuniform towards the edges. Since the distorted peaked regions near the image edges cannot be used for measurement purposes, the useable diameter of the image is only 8.5 inches, and not 10.6 inches.

SUMMARY OF THE INVENTION

The present inventor has discovered the cause of this distortion. It is caused by an interaction between the scintillations and the edges of the scintillator. When a radioactive particle strikes the scintillator at a point close to the edge, some of the emitted photons in the resulting scintillation are reflected by the peripheral edge of the scintillator. The reflected photons are detected by photomultipliers located towards the center of the photomultiplier array and cause the light spot representing the scintillation to be displaced towards the center of the oscilloscope from its proper place. Such a spot may be called a displaced light spot. The severity of this interaction increases as the scintillations approach the edge of the scintillator, and the overall effect is a folding over of the photographically recorded image at the edges. The two peaks in the curve of FIG. 3 are caused by the superposition of displaced light spots on top of properly placed light spots, and the dropoffs following the two peaks are caused by the vacancies that the displaced light spots should fill. This phenomenon is called "edge packing," and results from optical discontinuities near the edge of the scintillator which cause an image foldover.

In accordance with the present invention, it has been discovered that the distortion caused by edge packing can be significantly minimized and the useable surface area of the scintillator can be increased if the production of displaced light spots is suppressed. This has been done in the present invention by preventing radiation from striking the edge areas of the scintillator where scintillations that produce displaced light spots can occur.

FIG. 4 shows the results of a second test performed with the same 11 inch diameter wafer that was used in the test of FIG. 3. In the test of FIG. 4, the diameter of the collimator perforated surface has been reduced to 9.5 inches by elimination of the outermost collimator holes. As can be seen by comparing the curve of FIG. 3 with the curve of FIG. 4, this change in the collimator hole arrangement eliminates the undesirable peaks in the image intensity curve caused by superposition of light spots. This step of reducing the area of the scintillator that is exposed to radiation produces the beneficial result of increasing the useful diameter and area of the image. In this example, the useful diameter has increased from 8.5 inches to 9.5 inches, and the useable area has increased by 25 percent.

DESCRIPTION OF THE PREFERRED EMBODIMENTS

Figure 2:
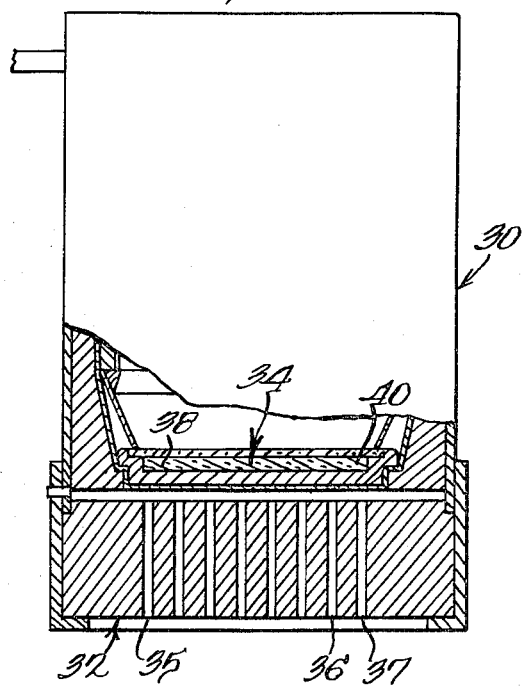
FIG. 2 is an elevational view, partly in section, of a parallel multihole collimator scintillation camera of conventional design.

FIG. 2 shows a scintillation camera 30 of conventional design, and equipped with a parallel multi-hold collimator 32 and with a scintillator 34. A detailed description of the camera 30 is presented in U. S. Pat. No. 3,011,057. The collimator 30 is penetrated by a large number of parallel holes such as the holes 35, 36 and 37. Many of these holes, such as the holes 35 and 37 visible in FIG. 2, lie below the edge portions 38 and 40 of the scintillator 34. These holes 35 and 37 were intended to increase the useful area of the scintillator, but because of edge packing their presence actually decreases the useful area of the scintillator 34, as explained above.

Figure 1:
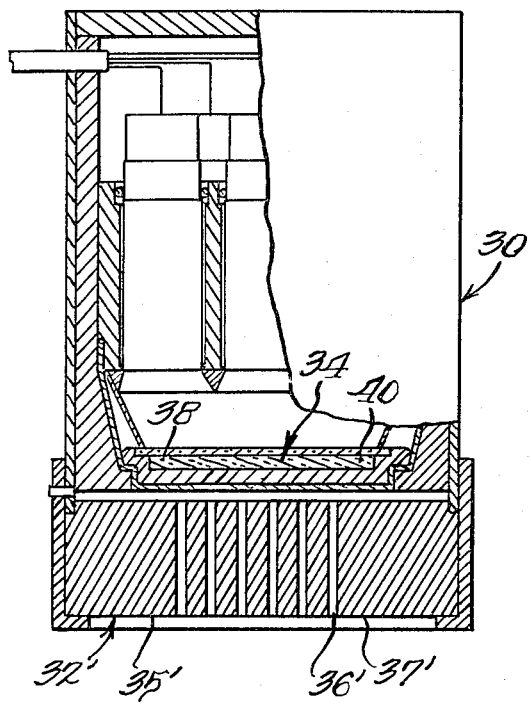
FIG. 1 is an elevational view, partly in section, of a parallel multihole scintillation camera modified in accordance with the present invention.

FIG. 1 shows the same scintillation camera 30 now equipped with a collimator 32' designed in accordance with the present invention. It will be noted that there are no holes at the locations 35' and 37' below the edge portions 38 and 40 of the scintillator 34. The collimator 32' does not allow radiation to strike the areas of the scintillator immediately adjacent the peripheral edge, and thus prevents image foldover from decreasing the useful area of the scintillator 34.

Figure 3:
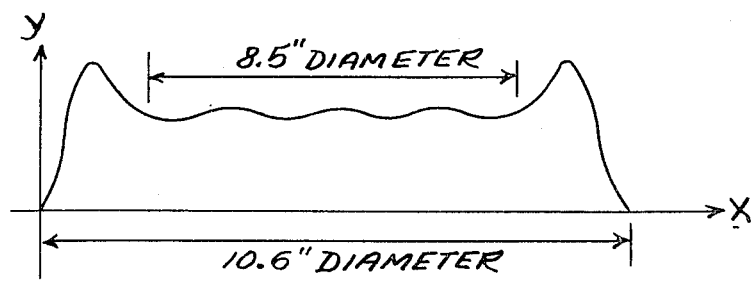
FIG. 3 is a diagram illustrating the magnitude and positioning of nonuniformities in images produced by a conventional scintillation camera not modified in accordance with the present invention.
Figure 4:
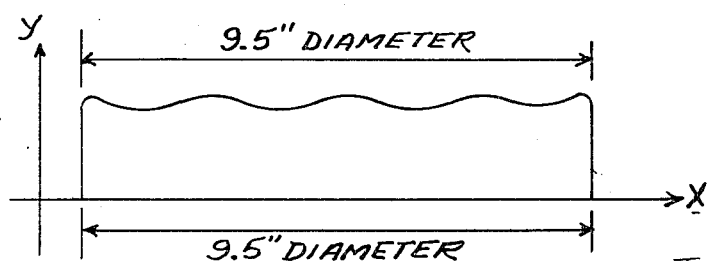
FIG. 4 is a diagram illustrating the magnitude and positioning of nonuniformities in images produced by a scintillation camera modified in accordance with the present invention.

The optimum collimator perforated surface diameter for any given scintillator must be determined by tests. The shielded peripheral region of the scintillator should be just wide enough to suppress peaks such as those appearing in the curve of FIG. 3. The shielded region should be no wider than this, since further shielding will itself reduce the useable size of the image.

The collimators 32 in FIG. 2 and 32' in FIG. 1 have been simplified for clarity. The collimators 32 and 32' contain only a few holes that are relatively large in diameter. A practical parallel hole collimator will usually contain as many as 1,000 holes each of which may be one-fourth inch in diameter.

The present invention can be used to improve the usable image size of almost any form of scintillation camera. Thus, while the one embodiment described above illustrates the use of the present invention with a parallel multi-hole collimator, it can also be used with any other form of multi-hole collimator. The present invention can also be used in conjunction with any type of scintillator, and in particular with detectors containing cadmium tungstate, calcium tungstate, cesium iodide activated with thallium, potassium iodide activated with thallium, anthracene, napthalene, transtilbene, terphenyl, solutions of terphenyl in a polymer, or any similar scintillating substance. The scintillator does not have to be round, it can be shaped as desired so long as the shielding is shaped to match the edge configuration. In the embodiments described above, photomultiplier tube arrays were used to detect and amplify the resulting visual image; the present invention can also be used in scintillation cameras utilizing a scanning type image detector and amplifier such as a vidicon or an image intensifier tube or a spark chamber, and even in a scintillation camera that does not include a visual image amplifying arrangement, such as an arrangement where photographic film is placed adjacent the scintillator detector.

While the invention has now been described with respect to the preferred embodiment, it will be apparent that numerous modifications can be made without departing from the spirit and scope of the invention, and it is therefore not desired to limit the invention to the exact details shown except insofar as they are defined in the following claims.

What is claimed as new and is desired to be secured by Letters Patent of the United States is:

1. A radiation detection device for investigating the radiations in a nonuniform radiation field and including a scintillator for converting said nonuniform radiation field into a correspondingly nonuniform light field, wherein the improvement comprises means for increasing the useful size of said light field, said means being impervious to said radiations and positioned in such manner as to prevent radiations from striking the peripheral areas of said scintillator.

2. A scintillation camera for investigating radiations and including collimator means for extracting a nonuniform radiation field from said radiations, a scintillator for converting said nonuniform radiation field into a correspondingly nonuniform light field, and photomultiplier light amplification means, wherein the improvement comprises means for increasing the useful size of said light field, said means being a section of said collimator means that is impervious to said radiations and positioned in such manner as to prevent radiations from striking the peripheral areas of said scintillator.

3. A scintillation camera according to claim 2 wherein the collimator means comprises a member impervious to said radiations and having a plurality of openings through which radiations directed towards and parallel to a particular opening may pass.

4. A scintillation camera for investigating radiations and including collimator means for extracting a nonuniform radiation field from said radiations, a scintillator for converting said nonuniform radiation field into a correspondingly nonuniform light field, and photomultiplier image amplification means for amplifying said light field, wherein the improvement comprises means for increasing the useful size of said light field, said means comprising shield means impervious to said radiations and positioned in such manner as to prevent radiations from striking the peripheral areas of said scintillator.

5. A scintillation camera according to claim 4 wherein the amplification means comprises a plurality of photomultiplier tubes, a cathode ray oscilloscope, and amplifying circuit means connecting said photomultiplier tubes to said cathode ray oscilloscope.

6. Detecting apparatus for producing an output in response to radiation emitted from a distributed radioactive source and impinging upon a relatively flat detecting medium extending generally transversely of the path of said radiation, said detecting medium converting said radiation into a distributed energy field having a distribution corresponding substantially to the distribution of radioactivity in said source, the improvement which comprises means for increasing the useful size of said energy field, said means including a collimator disposed between the source and the detecting medium and extending generally transversely of the path of the radiation, said collimator including at least one aperture therethrough for passing the radioactive rays from the source to the detecting medium to produce said energy field, said collimator further including means for masking the area of said detecting medium adjacent the peripheral edges thereof to inhibit the passage of radiation to said area, thereby increasing the useful size of said energy field.

7. The apparatus defined by claim 6 wherein said masking means comprises an area of said collimator impervious to said radiation and disposed around said aperture, said area of said collimator being oriented to shield said area of said detecting medium from said radiation.

8. The apparatus defined by claim 6 wherein said detecting medium comprises a scintillation crystal for emitting light pulses in response to said radiation.

9. The apparatus defined by claim 7 wherein said detecting medium comprises a scintillation crystal for emitting light pulses in response to said radiation.

10. Detecting apparatus for producing an output in response to radiation emitted from a distributed radioactive source and impinging upon a relatively flat detecting medium extending generally transversely of the path of said radiation, said detecting medium converting said radiation into a distributed energy field having a distribution corresponding substantially to the distribution of radioactivity in said source, the improvement which comprises means for increasing the useful size of said energy field, said means including a collimator disposed between the source and the detecting medium and extending generally transversely of the path of the radiation, said collimator including a plurality of apertures extending through an area thereof adjacent the center for passing the radiation from the source to the detecting medium to produce said energy field, said collimator further including means for masking the area of said detecting medium adjacent the peripheral edges thereof to inhibit the passage of radioactive rays to said area, thereby increasing the useful size of said energy field.

11. The apparatus defined by claim 10 wherein the masking means comprises a solid septum of said collimator surrounding the apertured center area, said septum being disposed to shield said area of said detecting medium from said radiation.

12. The apparatus defined by claim 10 wherein said apertures extend substantially parallel to each other through said collimator.

13. The apparatus defined by claim 11 wherein said apertures extends substantially parallel to each other through said collimator.

14. The apparatus defined by claim 10 wherein said detecting medium comprises a scintillation crystal for emitting light pulses in response to said radiation.

15. The apparatus defined by claim 10 wherein said radiation is gamma rays.

16. The apparatus defined by claim 14 wherein said radiation is gamma rays.

17. Apparatus for imaging a distributed radiation field including the combination of a scintillator and means for converting a radiation interacting with said scintillator into a corresponding output representing the coordinates of said interaction, wherein the improvement comprises means for increasing the range of outputs useful for imaging, said means being substantially impervious to said radiations and being positioned over a determinable peripheral area of said scintillator to prevent radiations from striking the determinable peripheral area of said scintillator, the determinable peripheral area being the area in which some interactions are converted into corresponding outputs representing the coordinates of adjacent areas and impairing the usefulness for imaging purposes of such adjacent areas.

18. Apparatus as claimed in claim 17, wherein said means for increasing the useful area of said scintillator comprises a radiation collimator having an outer solid portion shielding said determinable peripheral area of said scintillator.

19. Apparatus as claimed in claim 18, wherein said radiation collimator comprises a volume of substantially radiation impervious material defining a plurality of mutually spaced collimating apertures uniformly distributed over an area corresponding to the useful area of said scintillator with a peripheral solid portion corresponding to said determinable peripheral area of said scintillator.

20. A scintillation camera including a radiation collimator, a scintillator disposed on the downstream side of said collimator, and image amplifying means disposed on the side of said scintillator opposite said collimator for producing output signals corresponding to coordinates of interaction of radiation with said scintillator, wherein the improvement comprises means for increasing the useful imaging diameter of said camera, said means comprising a solid section of said collimator positioned adjacent a determinable peripheral area of said scintillator in which area interaction of radiations with said scintillator results in a substantial impairment of the imaging capabilities of areas of said scintillator adjacent said determinable peripheral area.

21. A scintillation camera having a thin cylindrical scintillation crystal having two opposing circular faces, a gamma ray collimator positioned adjacent one face of said crystal, a plurality of photomultiplier tubes positioned adjacent the other face of said crystal, and output circuitry coupled to said tubes to produce a pair of electrical signals representing the coordinates of the interaction of a gamma ray with said crystal; wherein the improvement comprises means for increasing the useful imaging diameter of said camera, said means comprising a solid, ring-shaped peripheral portion of said collimator that is impervious to radiations and that is positioned adjacent a determinable, ring-shaped peripheral area of said scintillator in which area interactions of gamma rays can impair the usefulness for imaging purposes of an additional ring-shaped area of said crystal adjacent said peripheral area, said means preventing radiations from striking the ring-shaped peripheral area of said scintillator.

* * * * *